United States Patent
Douglas

[15] 3,680,395
[45] Aug. 1, 1972

[54] WALKING LEG LINKAGE AND PROPULSION MECHANISM

[72] Inventor: Kenneth R. Douglas, 3760 Davie Blvd., Fort Lauderdale, Fla. 33312

[22] Filed: March 13, 1970

[21] Appl. No.: 19,268

[52] U.S. Cl. ..............................74/42, 74/45, 74/103, 180/8 E
[51] Int. Cl. .............................................F16h 21/22
[58] Field of Search..............74/45, 42, 103; 180/8 E

[56] References Cited

UNITED STATES PATENTS

| | | | |
|---|---|---|---|
| 178,125 | 5/1876 | Duecker | 74/45 X |
| 2,912,814 | 11/1959 | Witt et al. | 74/45 UX |
| 3,312,980 | 4/1967 | Erbach | 74/103 X |

Primary Examiner—Milton Kaufman
Attorney—Eugene F. Malin

[57] ABSTRACT

A device for propelling a vehicle across a planar surface without an axle or wheels. Each supporting point on the vehicle is comprised of a plurality of walking legs that are mechanically coupled to a source of rotational energy, a plurality of legs being so positioned with respect to each other that only one given leg is in contact with the planar surface at any given instant of time. The planar contacting point of each leg is moved in a closed path, the particular segment in contact with the planar surface being a linear direction only.

2 Claims, 4 Drawing Figures

PATENTED AUG 1 1972　　　　　　　　　　　3,680,395

KENNETH R. DOUGLAS
INVENTOR.

BY
ATTORNEY

WALKING LEG LINKAGE AND PROPULSION MECHANISM

BACKGROUND OF THE INVENTION

This invention relates generally to propulsion system having a linkage mechanism that provides a particular type of path motion to a plurality of leg members employed as one supporting member of a vehicle, with each device providing forward or reverse motion for a vehicle over a planar surface without producing unwanted oscillating motion on the vehicle in the direction perpendicular to the planar surface. Recent years have seen the need of improved vehicles that are capable of traveling over extreme varieties of terrains. Many times in certain severe and undeveloped, unpaved areas, the wheel is not suitable. There is a need for a different propulsion system employing members similar to walking legs. Applicant provides a leg walking support and linkage mechanism to translate rotational motion, such as from a motor or driving unit, to a plurality of walking legs in order to provide linear motion along given segments of the paths of the legs. Linear motion along a particular portion of the path is desirable to prevent vertical oscillation of the vehicle itself while moving in a horizontal direction. Vertical path movement of the leg members while in contact with the horizontal surface would result in erratic vertical oscillations of the vehicle.

BRIEF SUMMARY OF THE INVENTION

A vehicle propulsion and supporting device used for propelling a vehicle or the like across a planar surface comprising a vehicle supporting structure, a plurality of walking legs, a rotational shaft coupling said legs in a particular sequence about said shaft, a rotational source of energy, and a linkage mechanism coupling the shaft and legs to the rotational energy source. The linkage mechanism for each leg is comprised of a moving bar coupling the rotational energy source and the particular leg and a controlled arm moveably attached at one end to the moving bar and at the other to the vehicle. The combined motion of the rotating means and the moving bar attached to the leg provide a point of movement or path on a particular leg that moves in a partial arc direction. As the point on the leg moves through the partial arc, if an end point of the walking leg moveably attached to the vehicle structure to move only in the direction of a centerline through the center of the leg, the resultant path motion of the walking leg endpoint in contact with the planar surface must be a linear segment, the number of degrees of which will be a function of the various sizes and lengths of the bar control arm, and the joint location involved. As has been determined in the Applicant's co-pending linkage mechanism application, Ser. No. 882,801, filed Dec. 5, 1969, a moveable member so coupled to a supporting structure restricts the motion of the endpoint of the moveable member to a predetermined linear path with respect to the supporting structure when comprised of a supporting structure, a controlled arm having one end coupled to said supporting structure by a slip joint along the centerline allowing linear motion of said controlled arm linear in the first direction, a radial lever rotatably connected at one end to said supporting structure and at the opposite end to a point along the length of said controlled arm. In the instant invention, by properly choosing the cross bar length, the controlled arm length and the size of the rotating arm, a portion of the path where the supporting leg is attached to the cross bar, will move in a partial radius or in a partial arc. The radius of the rotating source should be shorter than the controlled arm to provide an inversion of the leg end point path so that upon reaching the linear portion of the path, each supporting leg will rise up and will complete its path in an ellipical fashion above the planar surface and return once again to the linear portion while in contact with the planar surface, completing the path. By providing a plurality of legs, each one at a different path segment, continuous propulsion is possible.

It is an object of this invention to provide vehicle walking legs for smoothly propelling a vehicle across a planar surface.

It is another object of this invention to provide a vehicle walking legs mechanism that is noncomplex in operation.

It is yet another object of this invention to provide vehicle walking legs in which rotational motion is converted into planar motion by walking legs having segments of their path linear to provide a smooth and efficient propelling mechanism.

And still yet another object of this invention is to provide walking legs planar propulsion in which oscillations in the direction perpendicular to the planar surface are eliminated.

In accordance with these and other objects which will be apparent hereinafter, the instant invention will now be described with particular reference to the accompanying drawings.

PREFERRED EMBODIMENT OF THE INVENTION

Figure 1:
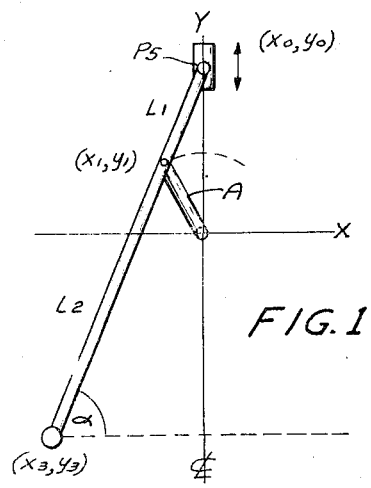
FIG. 1 shows linkage providing linear movement along a certain segment of its path.
Figure 2:
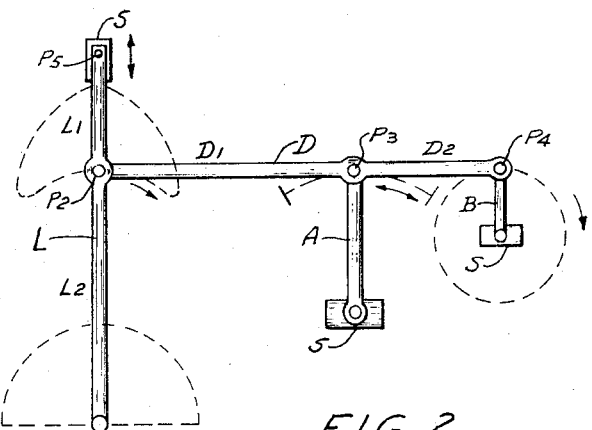
FIG. 2 shows a linkage schematic representation of a moveable leg connected to a rotating means in accordance with Applicant's invention.

Referring now to the drawings, a preferred embodiment of Applicant's invention is shown. FIG. 1 shows a linkage that provides the endpoint $(X_3, Y_3)$ of bar L1, L2 with a substantially linear path that makes an angle alfa with bar L1, L2. Controlled arm A is moveably attached to the bar dividing the bar into segments L1 and L2. The bar is slideably attached to a supporting structure along the Y axis allowing motion only in the Y direction. The Y axis represents a centerline. Lever arm A pivots around the center of the coordinate system $X=0$ $Y=0$ and is fixed to a supporting means (not shown). At a distance L2 from point $(X_1, Y_1)$ is the point whose motion is of interest $(X_3, Y_3)$. As point $(X_3, Y_3)$ moves away from the Y axis, the bar makes a smaller angle alfa with the perpendicular to the axis; it can be shown that as the angle alfa decreases from 90° the point $(X_3, Y_3)$ moves in substantially a linear path for a distance depending on the bar length, the length of lever arm A and the length of the bar segment L1. As the angle alfa is decreased, in general, a family of lines are generated of the type $Y=Kx + C$ where "K" is the slope of the line, which in this case is $-\tan \alpha$. This yields $Y0-Y3=-\tan\alpha$ (X3). Substituting Y0 in terms of L1, A, and alfa yields $Y_3+(L_1\cos \alpha +A^2-L_1^2\sin^2 \alpha) = \tan\alpha$ (X$_3$). Transposing and reducing each side gives $Y_3=(L-L_1) \sin \alpha -(A^2-L_1^2\cos^2\alpha)^{1/2}$. Substitution of numerical valves in this formula shows that Y3 remains substantially linear or constant for values of alfa and X3 near the Y axis. FIG. 2 shows a walking leg L comprised of segments L1, L2, and a geometrical diagram showing the path of the various points in the linkage mechanism. The leg L is slidably anchored at its top portion to supporting mechanism S and allows movement only in the direction indicated up and down slideable along the vertical direction. Leg L is divided into segments L1, L2 by point P2. Driving bar D is attached to leg L at point P2 and is rotatably attached to allow motion of the leg L. Driving bar D is fixed at its right side to a source of rotational motion at point P4 which is rotated in the direction indicated. Controlled arm A which is rotatably attached to the supporting structure at S divides the driving arm into segments $D_1$ and $D_2$. Circular rotation of point P4 in the direction indicated pulls the driving bar $D_1$ and because of the length of the controlled arm A and the radius of the rotating means B, the locus of point P2 on the bottom part of its path is a circular arc. As P4 preceeds around its circular path, the remaining portion of the closed path of P2 will rise reaching its highest point when P4 is 180° from the position shown. The combined resulting motion of controlled arm A and the moving radius arm B thus provides point P2 with the necessary circular arc motion of the bottom segment of its path in order to produce at point P1, a substantially linear path along the bottom segment of its enclosed path, in accordance what has been shown in FIG. 1.

Figure 3:
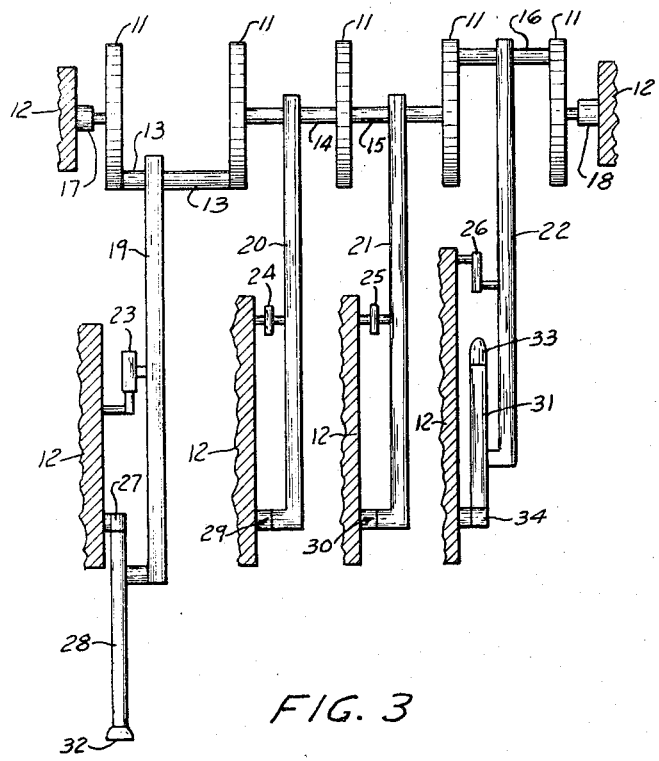
FIG. 3 is a top view of one supporting mechanism in accordance with Applicant's invention.

A device using this linkage principal is shown in FIG. 3 in which four legs are chosen, each leg to represent 90° rotation of the driving source. Thus only one leg would be in contact with the ground at any one time. For use in a vehicle, enough devices to balance and support the vehicle would be required, one at each corner, for example thus providing four cornered contact with the ground at all times. Only one such mechanism is shown in FIG. 3. In order to incorporate four walking legs, each one attached at a different phase of the rotational means, FIG. 3, a series of rotating discs 11 are shown that are rotatively coupled to the supporting means 12 by bearings 17 and 18; and are free to rotate about that position while fixed to the supporting means 12. A driving means or belt from an engine could rotate discs 11 but has not been shown for clarity. Each disc 11 corresponds to rotating means B in FIG. 2. Each disc 11 is coupled to different driving arms 19, 20, 21, 22 and the coupling at each disc is 90° apart so that coupling bars 13, 14, 15, 16 are spaced around their respective coupled discs 90° apart, to provide the proper sequential spacing of the walking legs. The driven bars 19, 20, 21 and 22 correspond to the bar D in FIG. 2. The top portion of controlled arms 23, 24, 25, and 26 are shown rotatably connected to the driven bar and to the supporting structure 12 and represent arm A in FIG. 2. The supporting legs 28, 29, 30, and 31 are shown in their different respective positions as view from the top, each leg corresponding to bar L in FIG. 2. The tops of the leg portions, such as 27, are slidably connected to the supporting structure 12. The ground contact points 32 and 33 can be observed from this position. As represented in FIG. 3, walking leg 29 at the bottom part of its path, as it would be if in contact with the ground, while leg 30 is at the top most portion of its path, with the other legs 28 and 34 representing positions between these points respectively. As discs 11 are rotated, respective driving arms 19, 20, 21, and 22 move (but are constrained by the controlled arms 23, 24, 25, and 26) so as to produce the proper partial arc motion of the bar along the point where it is connected to the legs 28, 29, 30, and 31.

Figure 4:
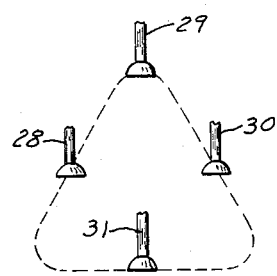
FIG. 4 is a schematic showing relative positions of the walking legs during one cycle.

FIG. 4 shows a side view showing only the walking legs contact points in the particular sequence of the device shown in FIG. 3. In one preferred embodiment, the vehicle would be constructed having four of the devices shown in FIG. 3, thus creating a 16 legged vehicle, having four legs in contact with the earth at any one given instant of time. All four devices would be driven from a single rotating source which could be done in any conventional manner, such as with a belt, chain, or drive shaft.

The device in FIG. 3 can be modified to provide any particular number of legs with the respective rotational angular spacing change as required. For example, three walking legs could be chosen instead of four, each leg being 120° apart in path sequence. The major requirement is that the walking leg must be moved in such a way that the segment along its midsection move in a arc and the top most portion be confined to a vertical motion to produce the proper linear motion along the bottom of the leg path. The linear path segment prevents oscillation in the direction perpendicular to the planar surface over which the leg is walking. The size of the path and the length of the steps will be controlled by several variables which (referring to FIG. 2) would be the length of the controlled arm A, the radial length of the rotating means B, the distance of D2 and D1 and these in combination with the lengths L1 and L2. For the proper rigidity of the structure, it is attached to a supporting means at the places shown at S in FIG. 2. $P_5$ in FIG. 2 could be attached to a very long radius arm since its movement is quite slight that would approximate linear up and down motion to achieve almost similar results in the final path motion.

The vehicle could incorporate applicant's invention to provide rapid backward and forward motion over rough, rocky, and undeveloped terrain that would not be suitable for a wheeled vehicle. Directional control could be achieved by slowing or accelerating the rotational rate of a particular corner device of the vehicle relative to another device, using conventional means, such as clutches and driving belts.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A driving support mechanism for converting rotational motion to partially linear closed path motion for a given end point on the guided end of a moveable member comprising:
- supporting means;
- a moveable member slidably connected at one end to said supporting means, the opposite end being the guided end;
- rotating means;
- controlled arm means coupled at one end to said supporting means; and
- linkage arm connecting said rotating means to said moveable member, said controlled arm moveably coupled at the opposite end to a first predetermined position along said linkage arm, said first predetermined position describing a circular arc, said linkage arm end coupled to said moveable member at a second predetermined position moveable in a closed path, a portion of which is circular, the guided end of said moveable member moveable about a closed path, a substantial portion of which is linear and corresponding to the circular arc portion of said second predetermined position.

2. A driving mechanism as in claim 1 including:
energy source means coupled to said rotating means for driving said moveable member guided end in a closed path, a substantial portion of which is linear.

* * * * *